United States Patent [19]

Kuwajima et al.

[11] Patent Number: 4,812,335

[45] Date of Patent: Mar. 14, 1989

[54] METHOD OF PAINTING

[75] Inventors: Teruaki Kuwajima, Higasiosaka; Kazuo Uenoyama, Osaka; Masaki Takae, Suita; Hidefumi Okuda, Toyonaka, all of Japan

[73] Assignee: Nippon Paint Co., Ltd., Osaka, Japan

[21] Appl. No.: 111,808

[22] Filed: Oct. 23, 1987

[30] Foreign Application Priority Data

Oct. 27, 1986 [JP] Japan ................... 61-256591

[51] Int. Cl.4 ................... B05D 1/36; B05D 7/00
[52] U.S. Cl. ................... 427/407.1; 427/409
[58] Field of Search ................... 427/407.1, 409

[56] References Cited

U.S. PATENT DOCUMENTS 4,391,858 7/1983 Batzill .................. 427/409 X
4,403,003 9/1983 Backhouse .................. 427/407.1
4,490,417 12/1984 Shirdow et al. .................. 427/409 X Primary Examiner—Michael Lusignan
Attorney, Agent, or Firm—Wenderoth, Lind & Ponack

[57] ABSTRACT

The present invention provides a metallic paint film featuring a remarkably excellent coating appearance as well as weather resistance, by using a specific combination of a water borne paint and thermosetting clear paint in compliance with the wet-on-wet two-coat, one-bake painting method.

9 Claims, No Drawings

METHOD OF PAINTING

FIELD OF THE INVENTION

The invention relates to a painting method, in particular to a painting method where a metallic paint film capable of providing an excellent paint film appearance and weather resistance is formed.

BACKGROUND OF THE INVENTION

Conventionally, in applying metallic coating for automobiles or the like, an undercoat such as a primer is painted in advance by electrodeposition, and baked and dried. An intermediate coat is then formed on the baked film. Next, a theremosetting metallic paint (hereinafter simply referred to as metallic paint) is applied on the intermediate coat and a thermosetting clear paint (hereinafter simply referred to as clear paint) is then applied thereon without heating or curing the metallic paint layer, i.e. with wet-on-wet, followed by heating or curing both the metallic paint layer and clear paint layer. The process, after the coating of metallic paint, is specifically called the two-coat, one-bake system.

In order to allow a clear paint to be applied in the wet-on-wet system, a metallic paint must have sufficient surface smoothness and quick drying properties to keep an interface between the clear paint and the metallic paint. Most of metallic paints is a solvent type in which an organic solvent is employed as a diluent. Further, in order to ensure a uniform metallic appearance and a satisfactory finish, a higher dilution ratio is necessary. On the other hand, such a use of solvent-type metallic paint has been increasingly regulated due to the consideration for prevention of contamination, improvements of work environments, and saving of natural resources. Accordingly, a water borne coating composition employing water as a diluent rather than a organic solvent has been recently considered.

It, however, has been impossible to successfully use a water borne coating composition as a metallic paint in the metallic/clear painting system. The reason is that it is difficult to control evaporation of water on spray-coating of the metallic paint. When using a water borne paint, a large scaled equipment is necessary for making the coating atmosphere extremely advantageous for the evaporation of water to result in high cost.

Japanese Patent Publication (unexamined) No. 157358/1971 discloses a method for controlling the viscosity of paint by incorporating crosslinked polymer microgels into a metallic paint. However, this method is not always satisfactory in a wide range of painting conditions. For example, under the conditions where water is used as a diluent, slowly evaporates, that is, under the conditions of a low temperature and high humidity, appearance of the obtained coating becomes poor. One possible cause is that the water content in the metallic paint allows, when clear paint is applied, the clear paint and metallic paint to mix with each other, thus deteriorating the orientation of metallic pigment to result in a poor appearance. Under the conditions where water rapidly evaporates, that is, under the conditions of a high temperature and low humidity, the metallic pigment is roughly oriented because of the rapid increase of viscosity thereby resulting in a poor appearance. Correspondingly, it is not advantageous to omit the preliminary drying or baking from this method after the metallic paint has been applied.

SUMMARY OF THE INVENTION

In view of the efficiency in resource, anti-pollution consideration and the like, it is the object of the present invention to provide a metallic paint film featuring a remarkably excellent coating appearance as well as weather resistance, by using a specific combination of water borne paint and thermosetting clear paint in compliance with the wet-on-wet two-coat, one-bake painting method. The invention is to provide a method of painting comprising:

coating, on a substrate provided with an undercoat or intermediate coat, a water borne clear paint made of resin composition (I) comprising ;
- (A) 94 to 30 parts by weight of vinyl copolymer having an acid value of 5 to 100, a hydroxyl value of 20 to 100, a solubility parameter ($\delta sp$) of 9.0 to 13.0 and a number average molecular weight of 3,000 to 50,000, and which is prepared by copolymerizing an ethylenic monomer having an acid group, an ethylenic monomer having a hydroxyl group and another ethylenic monomer copolymerizable therewith,
- (B) 5 to 40 parts by weight of a crosslinking component reactive component (A), and
- (C) 1 to 30 parts by weight of swelled resin particles swelled with an organic solvent having a solubility parameter of 7.5 to 13.0, and the resin particles having an average particle size of 0.01 to $10\mu$:
  then coating thereon, without curing the water borne metallic paint film, a thermosetting clear paint made of resin composition (II) comprising;
- (D) 95 to 60 parts by weight of a copolymer having a hydroxyl value of 20 to 100 and an absolute value of a difference of solubility parameter between said copolymers (A) and (D), of not less than 0.3, and which is prepared by copolymerizing an ethylenic group having a hydroxyl group and another ethylenic monomer copolymerizable with said monomer, and;
- (E) 5 to 40 parts by weight of a crosslinking component reactive with the component (D).

When a thermosetting clear paint is frther applied upon a water borne metallic paint with the wet-on-wet system, it is important that the water borne metallic paint film should not be redispersed, redissolved or aggregated with the clear paint. It has been ascertained that, according to the present invention, the proper selection of differences in solubility parameters and the addition of the swelled resin particles into the water borne metallic paint make it possible to effectively prevent a water borne metallic paint from being redispersed, redissolved or aggregated even under the conditions of a high humidity and low temperature. It also has been found that the addition of the swelled resin articles makes it possible to properly orient the metallic pigment even under the conditions of a high temperature and low humidity.

DETAILED DESCRIPTION OF THE INVENTION

Ethylenic monomers capable of forming a copolymer used for the preparation of a water borne metallic paint employed in the present invention are an ethylenic monomer having an acid group, an ethylenic monomer having a hydroxyl group and another ethylenic monomer capable of forming a copolymer together with any of these monomers.

Examples of an acid group are a carboxyl group, sulfonic group and the like. Examples of an ethylenic monomer having a carboxyl group are acrylic acid, methacrylic acid, crotonic acid, ethacrylic acid, propylacrylic acid, isopropylacrylic acid, itaconic acid, maleic anhydride, fumaric acid and the like. Examples of an ethylenic monomer having a sulfonic acid group are t-butylacrylamidesulfonic acid and the like. As a part of an acid group of the ethylenic monomer, the sulfonic acid, group is preferable. The sulfonic acid has an effect on the acceleration of curing.

Examples of the ethylenic monomers having a hydroxyl group are hydroxyethyl acrylate, hydroxypropyl acrylate, hydroxybutyl acrylate, hydroxymethyl methacrylate, hydroxyethyl methacrylate, hydroxypropyl methacrylate, hydroxybutyl methacrylate, N-methylolacrylamide, allyl alcohol and the like.

Examples of other ethylenic monomers are alkyl acrylates such as methyl acrylate, ethyl acrylate, isopropyl acrylate, n-propyl acrylate, n-butyl acrylate, t-butyl acrylate, 2-ethylhexyl acrylate, n-octyl acrylate, lauryl acrylate and the like; alkyl methacrylates such as a methyl methacrylate, ethyl methacrylate, isopropyl methacrylate, n-propyl methacrylate, n-butyl methacrylate, isobutyl methacrylate, t-butyl methacrylate, 2-ethylhexyl methacrylate, n-octyl methacrylate, lauryl methacrylate, stearyl methacrylate, tridecyl methacrylate; a product of an addition reaction between a fatty acid and an acrylate or methacrylate monomer having an oxirane structure, such as, a product of addition reaction between a stearic acid and glycidyl methacrylate; a product of an addition reaction between an oxirane compound containing an alkyl group having more than three carbons and an acrylic acid or methacrylic acid, such as, those disclosed in Japanese Patent No. 583185 and No. 609322; styrene, α-methylstyrene, o-methylstyrene, m-methylstyrene, p-methylstyrene, p-tert-butylstyrene, benzyl acrylate, benzyl methacrylate, itaconate such as dimethyl itaconate and others, maleate such as dimethyl maleate and others, fumarate such as dimethyl fumarate and others, acryronitrile, methacryronitrile, vinyl acetate and the like.

Three species of the above-mentioned monomers are polymerized in accordance with an ordinary process to form a copolymer; for example, such a monomer blend is mixed with a well-known polymerizing catalyst, added dropwise into a reaction vessel containing a solvent heated to a proper temperature for polymerization and matured to form a copolymer. Among these copolymers, the copolymer (A) having a solubility parameter ($\delta sp$) of 9.0 to 13.0 as well as a number average molecular weight of 3,000 to 50,000 is favorable for preparing a water borne metallic paint. As for the copolymer(A), when a solubility parameter is less than 9.0, either aggregation of a water borne metallic paint or dewetting of a clear paint occurs on applying the clear paint to result in poor appearance. When a solubility parameter is more than 13.0, atomization and dewetting occur on applying the metallic paint to cause poor appearance. Furthermore, the above solubility parameter can be determined with the following formula of K. SUH, J. M. COR BETT; Journal of Applied Polymer Science, 12, 2359('68):

$$\delta sp = (\sqrt{Vml} \cdot \delta ml + \sqrt{Vmh} \cdot \delta mh)/(\sqrt{Vml} + \sqrt{Vmh})$$

(ml stands for low Sp solvent; mh stands for high Sp solvent; $\delta$ represents a solubility parameter; V represents a molecular volume at turbidimetric point) When the number average molecular weight is less than 3,000, the viscosity decreases at the beginning of the curing and baking process to disturb the interface between the water borne metallic paint and the clear paint layer, thus resulting in a poor appearance. When the number average molecular weight is more than 50,000, atomization in painting with a sprayer is not properly carried out, so that satisfactory smoothness cannot be obtained and the appearance of finish deteriorates.

In order to solubilize the above copolymer resin, in compliance with an conventional method, an acid group contained in the copolymer resin such as a carboxyl group is neutralized with an alkali such as, monomethylamine, dimethylamine, trimethylamine, monoethylamine, triethylamine monoisopropylamine, diisopropylamine, diethylenetriamine, triethanolamine, monoisopropanolamine, diisopropanolamine, dimethylethanolamine, morpholine, methylmorpholine, piperazine, ammonium, sodium hydroxide, potassium hydroxide, lithium hydroxide and the like.

According to the present invention, a water borne metallic paint or a water borne clear paint is prepared from the resin composition (I) made by a combination of the copolymer (A) obtained as described above, the crosslinking component (B) and the specific resin particles (C). Examples of a crosslinking component (B) are a blocked polyisocyanate, a condensation product of an alyoxylated melamine formaldehyde, that is, an alyoxylated condensation product derived from a melamine formaldehyde or paraformaldehyde such as methoxymethylolmelamine, isobutoxylated methylolmelamine, or n-butoxylated methylolmelamine, and the like, among which at least one is used.

The resin particles used in the present invention are those swlled with an organic solvent having a solubility parameter of 7.5 to 13.0. The swelled resin particles preferably have an average particle size of 0.01 to 10$\mu$.

The resin particles are made of an acrylic or vinyl polymer or a copolymer. In preparing the polymer for such resin particles, it is desirable to use the so-called emulsion polymerization process. In other words, the acrylic or vinyl monomers are allowed to polymerize in a water borne solvent containing a surfactant and an emulsifying agent, in the presence of a polymerization initiator. The most favorable process is a process wherein the polymerization is affected by means of the so-called seed emulsion, and a process wherein, initially, water soluble oligomers are generated, whereby using the oligomers as the seed to allow emulsion polymerization. It is not necessary to describe these emulsion polymerization processes in detail, as they belong to the known art. In regard to these processes, especially in the case where the particle sizes are within a relatively small range (for example, 0.01 to 0.1$\mu$), the surfactant and the emulsifying agent used in emulsion polymerization are those conventionally used. However, in view of the fine particle size, a relatively large amount of emulsifying agent should be used. It is especially advantageous to use, together with or instead of the above-mentioned emulsifying agent, a compound or resin having an amphoteric ion group is described for example in Japanese Patent Publication (unexamined) Nos. 21446/1982, 21927/1982, 21464/1982, 40552/1982, 139111/1982, 187301/1982 and 187302/1982. The amphoteric ion group makes the polymerization system stabilized. Examples of the polymerization initiators are organic peroxides such as benzoyl peroxide, t-butyl peroxide, cumene hydroperoxide and others; organic azo compounds such as azobiscyanovaleric acid, azobis-isobutyronitrile, azobis(2,4-dimethyl)valeronitrile, azobis(2-aminodipropane)hydrochloride and others; inorganic water-soluble radical initiators such as potassium persulfate, ammonium persulfate, sodium persulfate, hydrogen peroxide and others; redox initiators; and the like. The proportion for usage of these surfactants, emulsifying agents, polymerization initiators, chain transfer agents and an aqueous medium, and the method of polymerization belong to the prior art. Although an emulsion in which the resin particles are dispersed is obtained by using an aqueous medium, the resin particles employed in the present invention are obtained by isolating them from the emulsion. When the resin particles are crosslinked polymer, a greater variety of organic solvents can be used. In such a case, the ethylenic unsaturated monomers previously mentioned may be allowed to carry groups capable of mutual reaction (for example, an epoxy and a carboxyl group, amine and carboxyl group, an epoxy and carboxylic anhydride group, amine and an acid chloride group, an alkyleneimine and a carbonyl group, an organoalkoxysilane and a carboxyl group, an hydroxyl and an isocyanate group, and the like). Otherwise, in addition to the above-mentioned polymerizing monomers, a component having more than two ethylenic unsaturated groups capable of radical polymerization, which is hereinafter referred to as a crosslinking monomer, is allowed to form a copolymer. Example of such a crosslinking monomer include a polymerizing unsaturated monocarboxylic ester being a multivalent alcohol, a polymerizing unsaturated alcohol ester being polybasic acid, an aromatic compound substituted by more than two vinyl groups and others.

Solvents for swelling the resin particles are those having a solubility parameter of 7.5 to 13.0. The examples of the solvents are alcohols such as ethanol, n-propanol, isopropanol, n-butanol, isobutanol, sec-butanol, t-butanol and the like; ketones such as acetone, methyl ethyl ketone, methyl isobutyl ketone and the like; eters such as methyl cellosolve, cellosolve, butyl cellosolve, butyl carbitol and the like; esters such as methyl cellosolve acetate, cellosolve acetate, butyl cellosolve acetate, ethyl acetate and the like; aromatic hydrocarbonates such as benzene, xylene, toluene and the like; and the like. The solvent can be employed solely or in combination. Preferred solvents are those having a solubility parameter of 8.5 to 11.5 and a particle size, when swelled, of 0.01 to 0.5μ. Preferably, the solubility of the solvent is smaller than that of the vinyl copolymer (A). Within the above solubility parameter, a swelled resin particles layer is formed on the surface of the water borne metallic coating to result in a preferred coating construction.

The metallic paint of the present invention is obtained from the resin composition (I) comprising 94 to 30 parts by weight of the copolymer (A), 5 to 40 parts by weight of the crosslinking component (B) and 1 to 30 parts by weight of the swelled resin particles (C) (total 100 parts by weight). When the amount of the crosslinking component (B) is less than five parts, the crosslinking degree becomes poor and when it is more than 40 parts by weight, the coatings is easily hydrolyzed and become poor in appearance. If the amount of the swelled resin particles (C) is less than one part by weight, the technical effects obtained by the addition of the resin particles are not attained, and this in turn makes the coating of clear paint in the wet-on-wet method difficult. If the amount of the resin particles is more than 30 parts by weight, it causes poor smoothness and a deteriorated appearance. The preferred acid value of the obtained resin composition (I) is 5 to 100, and the preferred hydroxyl value is 20 to 100. The acid value and hydroxyl value is generally dominated by the acid or hydroxyl groups in the copolymer mentioned above, so that the monomers used for synthesizing the copolymer can be selected sufficient to fall with the above acid or hydroxyl value. Acid values of less than 5 decline water dispersing stability and those of more than 100 deteriorate water-solubility to result in poor water resistance of the coatings. Hydroxyl values of less than 20 lower the degree of crosliking thereby resulting in the deterioration of the water resistance of the coatings. Hydroxyl values of more than 200 rapidly increase the hydrophilic groups when the coatings are hydrolyzed thereby deteriorating the water resistance.

In preparing a water borne metallic paint, various solvents, coloring agents (such as pigments, dyes and the like), fillers, surface-conditioning agents (such as silicon or acrylic resins) and others may be incorporated in the above-mentioned resin composition (I). As coloring agents, known pigments and dyes are usable. Accordingly, the coloring agents include metal oxides, metal hydroxides, metal powder, metal sulfides, salts such as sulfates, carbonates and lead chromate, carbon black, organic pigments and organic dyes. The pigments used in metallic paint include commercially available water-distribution type aluminum paste, ordinary aluminum paste and others. Typical examples include AW-500 and others marketed by Asahi Chemical Industry Co., Ltd. As mica pigments, Iriodin series dyes marketed by Merk Co., Ltd., and others, are available. Metallic dyes are generally incorporated into a paint by mixing them with a surfactant.

A thermosetting clear paint used according to the invention is prepared from the composition (II) comprising the specific vinyl copolymer (D) and the crosslinking component (E). The specific vinyl copolymer must have a hydroxyl value of 20 to 100. Accordingly, a copolymer of an ethylenic monomer having a hydroxyl group and another vinyl polymerizable monomer is used for this purpose. Examples of ethylenic monomers having hydroxyl groups are identical to those previously mentioned as usable for a metallic paint. As another vinyl polymerizing monomer capable of copolymerizing together with the ethylenic monomer having a hydroxyl group, those previously mentioned as usable for a metallic paint are available. The thermosetting clear paint can be in the form of a solvent-base type, water borne type, slurry type or powder type. To obtain the paint of any of these forms, necessary groups may be incorporated into the above-mentioned vinyl polymer. For this purpose, a method for incorporation is available. The crosslinking component (E) are those as mentioned in the crosslinking component (B).

It is necessary that the absolute value of the difference between the solubility parameter of the copolymer (D) and that of the copolymer (A) is not less than 0.3. If the value is less than 0.3, a metallic paint mixes with a clear paint, resulting in poor appearance.

The resin composition (II) is obtained by blending, in terms of a solid resin component, 95 to 60 parts by weight of the above-mentioned copolymer with 5 to 40 parts by weight of the crosslinking component (total 100 parts weight). If the proportion of the latter is less than five parts by weight, a crosslinking degree of paint film will not be satisfactorily high. On the other hand, if the proportion exceeds 40 parts by weight, the coatings will be readily hydrolyzed. Additionally, the preferred acid value of the resin composition (II) is 5 to 100, and the preferred hydroxyl value is 20 to 100. If the acid value and/or hydroxyl value do not comply with these ranges, they will cause disadvantages identical to those previously described for the water borne metallic paint. The clear paint may contain various types of solvents, surface conditioning agents or ultraviolet absorbing agents, light-stabilizing agents and others, in addition to the above-mentioned resin composition. In forming a paint film by the two-coat, one-bake process with a water borne metallic paint and a thermosetting paint having the above-mentioned composition, a conventional technique may be applied, wherein, for example, each paint is diluted to a specific viscosity. Then the metallic paint is spray applied so as to form a paint film having a thickness of about $20\mu$, whereby, after 1 to 10 minutes of setting, air-blowing, hot air-blowing, drying and/or heating, the clear paint is spray applied so as to form a paint film having a thickness about 20 to 60; after 3 to 10 minutes of setting, both paints are baked at a specific temperature for a specific period of time.

Compared to a coat obtainable from a conventionally known two-coat, one-bake paint system, the coat obtained in this manner has an excellent appearance as well as excellent properties, especially regarding exposure-weather resistance.

EXAMPLES

The present invention is illustrated by the following examples, which, however, is not to be construed as limiting the invention to their details. In the examples, "part", "%" and "ratio" are based on weight.

PREPARATION EXAMPLE 1

Preparation of polyester resin having amphoteric ion group

Into a 2 l flask equipped with a stirrer, a nitrogen-introducing tube, a temperature controller, a condenser and a decanter, 134 parts of bishydroxyethyltaurine, 130 parts of neopentyl glycol, 236 parts of azelaic acid, 186 parts of phthalic anhydride and 27 parts of xylene were added. The contents were then heated. The water generated through the reaction was azeotropically removed, together with xylene.

The solution was gradually heated to 190° C. for approximately two hours after the beginning of reflux, and stirring and dehydration were continued until an acid value equivalent to carboxylic acid reached 145; the solution was then cooled to 140° C. Next, with the temperature kept constant at 140° C., 314 parts Cardula E10 (glycidyl varsatate manufactured by Shell Chemical Company) was added dropwise for 30 minutes. Subsequently, stirring was continued for two hours to complete the reaction. The obtained polyester resin had an acid value of 95, a hydroxyl value of 90, and Mn of 1054.

PREPARATION EXAMPLE 2

Preparation of resin particles

A 1 l reaction vessel equipped with a stirrer, a condenser and a temperature controller was charged with 282 parts of deionized water, 10 parts of the polyester resin obtained in preparation example 1 and 0.75 parts of dimethylethanolamine and stirred at a constant temperature of 80° C. to dissolve. A solution prepared by dissolving 4.5 parts of 4,4'-azobis(cyanopentanoic acid) into 45 parts of deionized water and 4.3 parts of dimethylethanolamine was added to the resultant mixture. Then, a mixture solution containing 70.7 parts of methyl methacrylate, 94.2 parts of n-butyl acrylate, 70.7 of parts styrene, 30 parts of 2-hydroxyethyl acrylate and 4.5 parts of ethylene glycol dimethacrylate was gradually added dropwise for 60 minutes. Next, a solution prepared by dissolving 1.5 parts 4,4'-azobis (cyanopentanoic acid) into 15 parts deionized water and 1.4 parts dimethylethanolamine was further incorporated, and stirring was continued for 60 minutes at a temperature of 80° C. to obtain an emulsion having a nonvolatile content of 45%, a pH value of 7.2, a viscosty of 92 cps (25° C.) and a particle size of $0.156\mu$. The emulsion was subjected to a spray drying to remove water, and redispersed into xylene at a rate of 100 parts by weight of the resin particles per 200 parts by weight of xylene to obtain a xylene dispersion of the resin particles. The resin particles have a particle size of $0.3\mu$.

EXAMPLES 1-6

A 1 l reaction vessel equipped with a stirrer, a temperature controller and a condenser tube was charged with 76 parts of ethyleneglycol monobutyl ether, and then 61 parts of a monomer solution containing 45 parts of styrene, 63 parts of methyl methacrylate, 48 parts of 2-hydroxyethyl methacrylate, 117 parts of n-butyl acrylate, 27 parts of methacrylic acid, 3 parts of laurylmercaptan and 3 parts of azobisisobutyronitrile was added and heated to a temperature of 120° C. with stirring. Another 245 parts of the above-mentioned monomer solution was added dropwise over three hours and stirring was continued for one hour. Then, 28 parts dimethylethanolamine and 200 parts deionized water were added to obtain an acrylate resin varnish having a 50% volatile content and a number average molecular weight of resin of 6,000. The resin had an OH value of 70, an acid value of 58 and a Sp value of 11.3.

Under conditions similar to those of the above-mentioned preparation, different resin varnishes were prepared in compliance with the monomer blends shown in Table - 1 below.

TABLE 1

| Example | Monomer blend | | | | | | | | Neutralizing agent | Neutralizing ratio | Solvent | Characteristic | | | |
|---|---|---|---|---|---|---|---|---|---|---|---|---|---|---|---|
| | EHA[1] | St[2] | MMA[3] | LMA[4] | HEMA[5] | MAA[6] | AMPS[7] | AINB[8] | | | | OH value | Acid value | Sp | Mn |
| 2 | — | — | 50.0 | 39.2 | 9.3 | 1.5 | 0.5 | 2.5 | DMEA[9] | 100 | BDG[10] | 40 | 10 | 10.0 | 8000 |
| 3 | — | 52.6 | — | 21.9 | 16.2 | 9.2 | 0.5 | 2.0 | DMEA | 100 | BDG | 70 | 60 | 10.5 | 1000 |
| 4 | 54.7 | 20.0 | 11.5 | — | 9.3 | 4.6 | 0.5 | 5 | DMEA | 100 | Xylene | 40 | 30 | 9.8 | 6000 |
| 5 | 35.1 | — | 41.0 | — | 11.6 | 12.3 | 2.0 | 2.5 | DMEA | 100 | Ethyl cellosolve | 50 | 80 | 11.5 | 8000 |

TABLE 1-continued

| Example | Monomer blend | | | | | | | | Neutralizing agent | Neutralizing ratio | Solvent | Characteristic | | | |
|---|---|---|---|---|---|---|---|---|---|---|---|---|---|---|---|
| | EHA[1] | St[2] | MMA[3] | LMA[4] | HEMA[5] | MAA[6] | AMPS[7] | AINB[8] | | | | OH value | Acid value | Sp | Mn |
| 6 | 27.1 | 42.2 | 5.3 | — | 16.2 | 9.2 | 0.5 | 1.0 | DMEA | 100 | BDG | 70 | 60 | 10.7 | 15000 |

[1] 2-Ethylhexyl acrylate
[2] Styrene
[3] Methyl methacrylate
[4] Lauryl methacrylate
[5] 2-Hydroxyethyl methacrylate
[6] Methacrylic acid
[7] 2-Acrylamide-2-methylpropanesulfonic acid
[8] Azobisisobutyronitrile
[9] Dimethylethanolamine
[10] Butyl diglycol A methoxy-methylolmelamine ("Cymel 303" manufactured by Mitsui Toatsu Chemicals, Inc.) and an n-butoxymethylolmelamine ("U-ban 120" manufactured by Mitsui Toatsu Chemicals Inc.) were used as cross-linking agents. The combinations of such an agent with other components, and the amount of blending thereof, are shown in Table - 2 below.

Preparation of metallic paint

A mixture prepared by blending both a dispersion containing organic solvent-swelled resin particles obtained in preparation example 2 and an aluminum pigment ("ALPASTE 60-760" manufactured by Toyo Aluminium K.K.) into the above-mentioned resin varnish was diluted with deionized water until the value measured with No. 4 Ford Cup had reached 25 to 30 seconds (20° C.), in preparation of a metallic paint.

TABLE 2

| Example | Cross-linking agent | | Water soluble varnish | Dispersion containing resin particles | Aluminum pigment paste |
|---|---|---|---|---|---|
| | Cymel 303 | U-ban 120 | | | |
| 1 | 30 | — | 140 | 30 | 15 |
| 2 | — | 30 | 140 | 30 | 15 |
| 3 | — | 30 | 140 | 30 | 15 |
| 4 | — | 30 | 140 | 15 | 15 |
| 5 | 30 | — | 140 | 60 | 15 |
| 6 | — | 30 | 140 | 15 | 15 |

EXAMPLE 7

Preparation of solvent-type clear paint

An apparatus equipped with a stirred, a temperature controller and a reflux condenser was charged with 70 parts of xylene and 20 parts of butanol, and the temperature in the apparatus was increased under stirring after 20 parts of the solution comprising the following ingredients were added.

| | | |
|---|---|---|
| Methacrylic acid | 1.2 | parts |
| Styrene | 26.4 | parts |
| Methyl methacrylate | 26.4 | parts |
| n-Butyl acrylate | 36.0 | parts |
| 2-Hydroxyethyl acrylate | 10.0 | parts |
| Azobisisobutyronitrile | 1.0 | part |

The remainder of the above solution (81.0 parts) was added dropwise under reflux for two hours, and a solution comprising 0.3 parts of azobisisobutyronitrile and 10 parts of xylene was added dropwise over 30 minutes. The reaction solution was refluxed with stirring for another two hours to complete the reaction, thus preparing an acrylate resin varnish having a nonvolatile content of 50% and a number average molecular weight of 8,000. The resin had a δsp value of 10.26 and an OH value of 48.

Subsequently, the following compositions were poured into a stainless vessel and stirred with a stirrer to experimentally prepare paints in accordance with respective preparation examples.

| | |
|---|---|
| Varnish of example 7 | 100 parts |
| U-ban 20 SE-60 | 36 parts |
| Modaflow (manufactured by Monsanto Chemical) | 0.5 parts |
| Resin particles of preparation example 2 | 2.2 parts |

EXAMPLE 8

Preparation of solvent-type clear paint

An apparatus identical to that of example 7 was charged wtih 57 parts of xylene and 6 parts of n-butanol; then, the temperature in the apparatus was increased under stirring, after 20 parts of a solution comprising the following composition were added.

| | | |
|---|---|---|
| Styrene | 30.0 | parts |
| Ethylhexyl methacrylate | 45.2 | parts |
| Ethylhexyl acrylate | 5.5 | parts |
| 2-Hydroxyethyl methacrylate | 16.2 | parts |
| Methacrylic acid | 3.1 | parts |
| Azobisisobutyronitrile | 4.0 | parts |

Under reflux, the remainder of the above solution (84 parts) was added dropwise over two hours, after which a solution containing 0.5 parts of azobisisobutyronitrile, 23 parts of xylene and 14 parts of n-butanol was added dropwise for 20 minutes. The reacting solution was refluxed with stirring for another two hours to complete the reaction, thus preparing an acrylate resin varnish having a nonvolatile content of 50% and a number average molecular weight of 3,400. The resin had an sp value of 10.26 and an OH value of 48.

Subsequently, the following compositions were poured into a stainless vessel and stirred with a stirrer to experimentally prepare paints in accordance with respective preparation examples.

| | |
|---|---|
| Varnish of example 8 | 100 parts |
| N-75 | 16.7 parts |

EXAMPLES 9-12

Preparation of water borne clear paint

Under conditions identical to those of example 1, different copolymers (D) were prepared in compliance with the monomer blends shown in Table - 3 below.

TABLE 3

| Example | Monomer blend | | | | | | | | | Neutralizing agent | Neutralizing ratio | Solvent | Characteristic | | | |
|---|---|---|---|---|---|---|---|---|---|---|---|---|---|---|---|---|
| | EHA | nBA[11] | St | MMA | EA[12] | HEMA | MAA | AMPS | AINB | | | | OH value | Acid value | Sp | Mn |
| 9 | | 65.8 | | 11.8 | | 16.2 | 6.1 | 0 | 5 | DMEA | 100 | BDG | 70 | 40 | 11.0 | 6000 |
| 10 | | 51.0 | | 22.4 | 1.2 | 16.2 | 9.2 | 0.6 | 5 | DMEA | 100 | Ethyle cellosolve | 70 | 60 | 11.5 | 6000 |
| 11 | 24.5 | | 20 | 34.7 | | 16.2 | 4.6 | 0 | 5 | DMEA | 100 | Ethyle cellosolve | 70 | 30 | 10.7 | 6000 |
| 12 | 48.2 | | | 26.3 | | 16.2 | 9.2 | 0.6 | 5 | DMEA | 100 | BDG | 70 | 60 | 11.0 | 6000 |

[11]n-Butyl acrylate
[12]Ethyl acrylate

Hexamethoxymethylolmelamine ("Cymel 303" manufactured by Mitsui Toatsu Chemicals, Inc) was mixed as a cross-linking agent with the obtained resin varnish so that the proportion of solid resin component reached 70/30. A water borne clear paint was obtained by diluting the above-mentioned mixture with deionized water until the measurement with Ford Cup No. 4 had reached 30–35 seconds (20° C.).

Experimental Example

Onto each steel plate provided with an intermediate coat, one of the metallic paints respectively prepared in examples 1 through 6 is applied, and further, one of the clear paints respectively prepared in examples 7 through 8 was applied, using an air sprayer under an environment of a temperature of 23° C. and humidity of 60%, so that the former forms a 20μ thick dried coat and the latter forms a 30μ thick similar coat. The former was applied in one minute intervals in two stages, and after a five minute interval, the latter was applied with the so-called wet-on-wet method in a single stage; both were then allowed to set for seven minutes. Next, the painted plate was baked with a drying machine at a temperature of 150° C. for 20 minutes to prepare each test plate. The results of the evaluation of appearance and weather resistance are shown in Table - 4. The above-mentioned steel plate used in the experiment comprises a polished soft steel plate having been subjected to degreasing, disposed thereon, a coat of electrocoating paint for automobiles applied in an intermediate painting line.

| Test plate No. | Metallic paint | Clear paint | Sp | Appearance[1] | Weather resistance[2] |
|---|---|---|---|---|---|
| 1 | Example 1 | Example 9 | 0.34 | Good | 98 |
| 2 | Example 2 | Example 11 | 0.7 | Good | 98 |
| 3 | Example 3 | Example 12 | 0.5 | Good | 98 |
| 4 | Example 4 | Example 11 | 0.9 | Good | 96 |
| 5 | Example 5 | Example 12 | 0.5 | Good | 98 |
| 6 | Example 6 | Example 10 | 0.8 | Good | 98 |
| 7 | Example 1 | Example 7 | 1.04 | Good | 99 |
| 8 | Example 1 | Example 8 | 1.4 | Good | 99 |
| Comparison example 1 | Example 5 | Example 10 | 0 | Bad | 87 |
| Comparison example 2 | Example 6 | Example 11 | 0 | Fairly | 90 |

| Test plate No. | Metallic paint | Clear paint | Sp | Appearance[1] | Weather resistance[2] |
|---|---|---|---|---|---|
| example 2 | | | | good | |

[1]Appearance is visually evaluated.
[2]Weather resistance is determined by Sunshine weatherometer (2000 hours, 60° C., gloss retention).

What is claimed:
1. A method of painting comprising:
   coating, on a substrate provided with undercoat or intermediate coat, a water borne metallic paint made of resin composition (I) comprising;
   (A) 94 to 30 parts by weight of vinyl copolymer having an acid value of 5 to 100, a hydroxyl value of 20 to 100, a solubility parameter (δsp) of 9.0 to 13.0 and a number average molecular weight of 3,000 to 50,000, and which is prepared by copolymerizing an ethylenic monomer having an acid group, an ethylenic monomer having a hydroxyl group and another ethylenic monomer copolymerizable therewith,
   (B) 5 to 40 parts by weight of a crosslinking component reactive with component (A), and
   (C) 1 to 30 parts by weight of swelled resin particles swelled with an organic solvent having a solubility parameter of 7.5 to 13.0, and the resin particles having an average particle size of 0.01 to 10μ:
   then coating thereon, without curing the water borne metallic paint film, a thermosetting clear paint made of resin composition (II) comprising;
   (D) 95 to 60 parts by weight of a copolymer having a hydroxyl value of 20 to 100 and an absolute value of a difference of solubility parameter between said copolymers (A) and (D), of not less than 0.3, and which is prepared by copolymerizing an ethylenic group having a hydroxyl group and another ethylenic monomer copolymerizable with said monomer, and;
   (E) 5 to 40 parts by weight of a crosslinking component reactive with the component (D).

2. The method of painting as claimed in claim 1, wherein the swelled resin particles are prepared by swelling in an organic solvent having a solubility parameter of 7.0 to 13.0 resin particles which have been prepared by emulsion polymerization in an aqueous solvent.

3. The method of painting as claimed in claim 1, wherein the swelled resin particles are swelled with an organic solvent of 8.5 to 11.5 and have a particle size of 0.01 to 0.5.

4. The method of painting as claimed in claim 1, wherein the solubility parameter of an organic solvent for swelling the resin particles is less than that of the copolymer (A).

5. The method of painting as claimed in claim 1, wherein the resin particles are prepared by an emulsion polymerization using an emulsifying agent having an amphotetic ion group.

6. The method of painting as claimed in claim 1, wherein among monomers in said (A), a part of acid groups of ethylenic monomers having an acid is a sulfonic group.

7. The method of painting as claimed in claim 1, wherein a thermosetting clear paint is of a water dilution type.

8. The method of painting as claimed in claim 1, wherein a thermosetting clear paint is an organic solvent type clear paint comprising more than 40% of a nonvolatile component.

9. A method according to claim 1 in which the resin composition (I) is a water soluble resin composition and contains water as a diluent.

* * * * *